Oct. 14, 1952 A. F. NATHAN 2,613,701
HYDRAULICALLY OPERATED JIG SAW
Filed Oct. 2, 1946 5 Sheets-Sheet 1

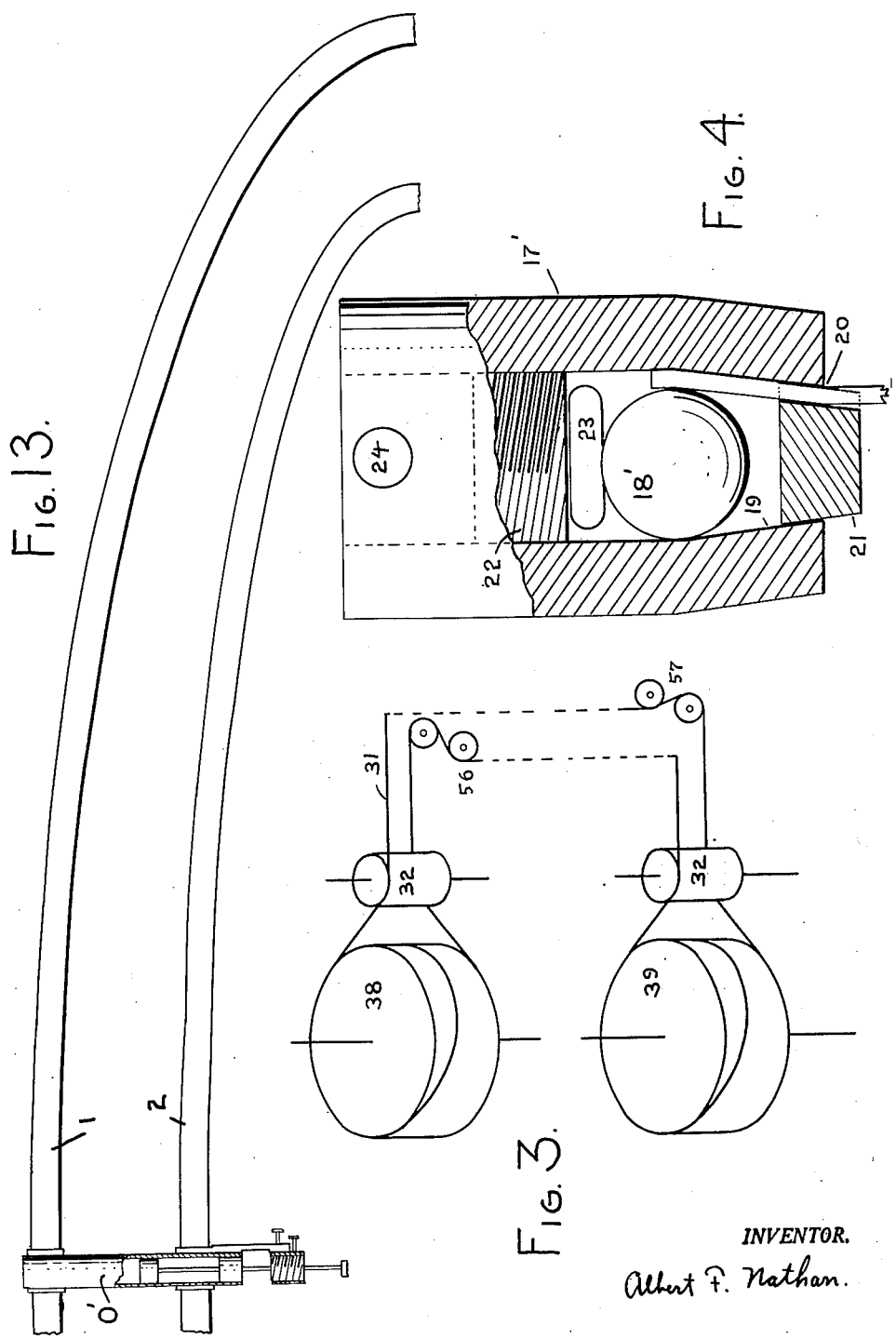

Oct. 14, 1952          A. F. NATHAN          2,613,701
HYDRAULICALLY OPERATED JIG SAW
Filed Oct. 2, 1946          5 Sheets-Sheet 4
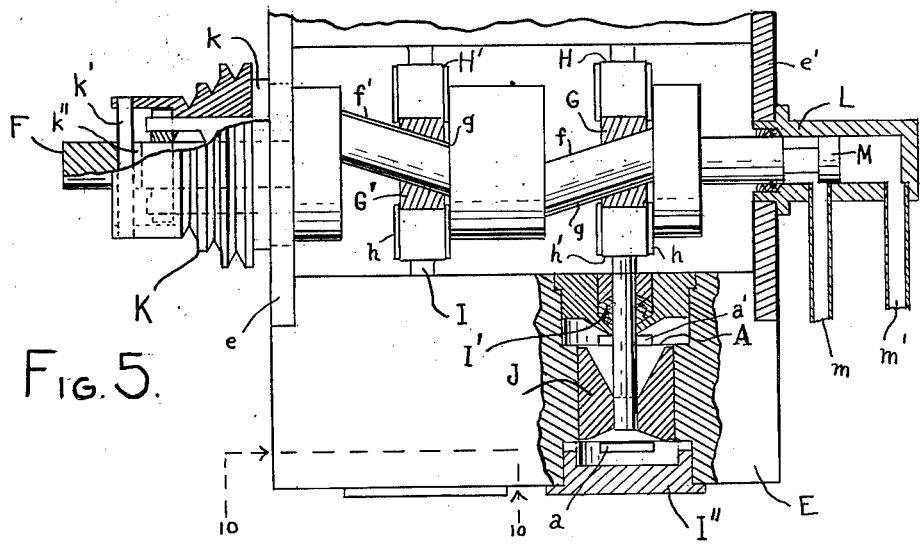
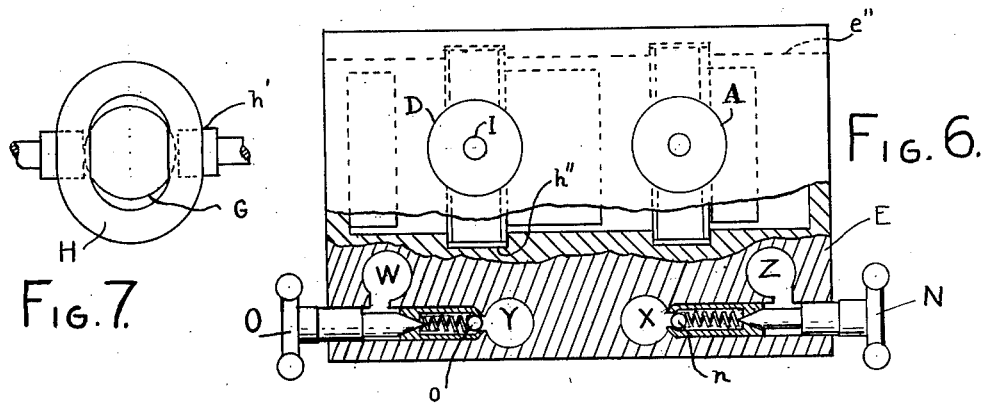
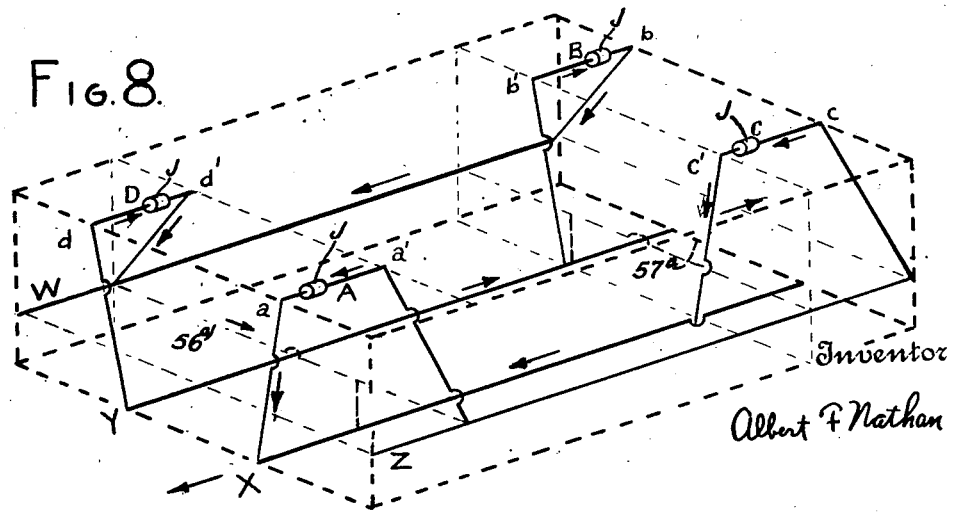
Inventor
Albert F Nathan Oct. 14, 1952     A. F. NATHAN     2,613,701
HYDRAULICALLY OPERATED JIG SAW
Filed Oct. 2, 1946     5 Sheets-Sheet 5

INVENTOR.
Albert F Nathan

UNITED STATES PATENT OFFICE 2,613,701

HYDRAULICALLY OPERATED JIG SAW

Albert F. Nathan, Plainfield, N. J.

Application October 2, 1946, Serial No. 700,708

6 Claims. (Cl. 143—74)

The aim of this invention is a jig-saw organization contrived to obviate some undesirable characteristics inherent in existing types; notably, to relieve the blade from carrying the burden of inertia of any of the mechanical elements, also to enable both its length of stroke and frequency to be increased, also to reduce vibration and, furthermore, to enable the blade to be readily oriented about its longitudinal axis to any position without removing it from or stopping the machine.

In existing types, the blade acts as an agent in transmitting the oscillatory movement from one to the other of the two elements to which its ends are secured. Consequently, the blade is obliged to carry and overcome the momentum of such element and, as this momentum or inertia increases with the square of the velocity, the ability of the blade to withstand breakage is a greatly limiting factor on the speed so that the cutting effect is actually much less than the blade, if relieved from such external shocks, could achieve. The importance of this is manifested in accentuated form with the finer blades. The type of sawing, for which jig-saws are particularly useful, is where hairline cuts are needed; as in delicate jewelry work, jig-saw puzzles, and in a great number of other instances where it is desired to have the severed parts of the work fit together very closely, as in-lays. A blade but a few thousandths thick and a few thousandths broad is necessarily very fragile and existing machines are hardly suitable for handling such blades.

A notable characteristic of the present invention is its ability to operate as to all of its parts in identically the same manner whether a blade be inserted or not. That is to say, the two oppositely spaced members (to which the ends of the blade are respectively attached) will oscillate in synchronism in this machine and always maintain the same gap between their ends irrespective of the effect of any blade that may or may not be attached between them. The limiting factors on the frequency of oscillation of the mechanical elements constituting this mechanism depends solely upon their aggregated inertia. It is not in any degree influenced by the presence or non-presence of the blade. By utilizing this principle, the finest blade available can be used for cutting with facility wood nearly as thick as the length of the tooth portion of the blade. Thus, the finer blades now available are toothed for about three of their over-all length of five inches. Such blades, in this organization, can cut wood up nearly two and three-quarter thick, if adjusted for a stroke of ¼ inch. By way of comparison, it may be stated that conventionally such blades are limited to use in cutting wood in the neighborhood of a quarter inch thick, and rarely more because otherwise they would be quickly broken.

This positive synchronism of oscillation cannot be achieved where a considerable throat is required which is the case with a purely mechanical jig-saw on account of back-lash and vibration. To cut through an area of wood at a point two feet from its remote edge requires, of course, a throat of at last that depth. The frame of a jig-saw thus resembles a tuning-fork and, apart from the virtual impossibility of mechanically transmitting accurately synchronized reciprocations from the tip of one area to the tip of the other, there occurs much vibration even at moderate speeds and this is greatly augmented or magnified by the tuning-fork action of the frame especially when the oscillations are in step with the pitch of the frame.

The feature of this organization making provision for varying the length of the stroke is useful. This enables the mechanism to use blades of different lengths. Obviously, a length of blade less than the length of the stroke could not be used. With this mechanism, however, if a blade be broken then the good portion can still be used by decreasing the length of the stroke. This variation in the length of the stroke is progressively accomplished by the peculiar mounting of the cams on their axes, whereby when shifted, their eccentricity can be simultaneously increased from zero upwards.

This refinement is advantageous when sawing delicate detail such, for instance, as in jewelry work where thin sheets of precious metal are being patterned. By merely swinging a lever (which may be done while the machine is running) the blade may be stopped, the work oriented about the blade as an axis to the degree desired and then the sawing may be gradually increased at any desired stroke. Or, the blade may itself be oriented either while stationary or in operation through a means provided for that purpose. These provisions enable the jeweler or other user to cause the machine, without loss of time on his part, to conform to all of the delicate configurations pattern to be cut; all of which the jeweler has been obliged to do much more slowly by use of a hand-saw, and hence with greater precision.

Where the work is of considerable area, it is difficult in conventional machines to saw a sharp corner or angle because of the skill required in orienting the large piece of work about the blade as an axis while it is running and without making erratic saw-cuts at the corners. But, in this machine, by merely turning a finger piece the blade may be accurately oriented, either to the right or to the left, and to the extent of the direction of the cut to be made, and with regard to the grain of the wood. All hair-like saws tend to follow the grain of wood and, to compensate for this, the blade needs to be reversely oriented; sometimes to a pronounced degree.

Another advantageous characteristic is the capacity of the machine for shifting vertically the operating zone of its stroke. In certain types of work, where it is desirable to use short strokes and where the work is relatively thin, but a small portion of the teeth would ordinarily receive all the wear. In this machine, however, when the teeth in that portion become unduly dulled, the zone may be readily shifted to bring a new tooth section into action and again without stopping the machine. Or, the zone-determining means may be adjusted so that the machine automatically will gradually shift its zone of operation at a rate more or less corresponding to the rate the teeth become dulled by their work. This effects a material saving in blade replacements and likewise enhances the efficiency of the general operation.

In conjunction with the above mentioned characteristic provision is made for changing the speed of the machine so that when set for making very short strokes, its speed may be stepped up and, likewise, in making the full stroke its speed may be reduced so that the vibration in general may be kept within tolerances. Or, on the other hand, the cutting action may not be too rapid which is again desirable in certain types of very delicate work.

A typical embodiment of my invention for achieving these ends will now be disclosed in connection with drawings, of which:

Fig. 3 is a diagrammatic lay-out of the orientator.

Fig. 4 is an enlarged mid-section of a collet affixible to the end of a blade to facilitate its attachment to the reciprocating shafts.

Fig. 5 is a sectional-plan of one form of variable stroke and variable speed oscillator.

Fig. 6 is an end-elevation, partly in section, of the same.

Fig. 7 is a detail of a cam and yoke for simultaneously reciprocating two pistons.

Fig. 8 is a perspective diagram showing the relation of the eight ports to the inlet and outlet channels of the unit.

Fig. 13 (Sheet 3) shows a modified location of the blade tautener.

Figure 1:
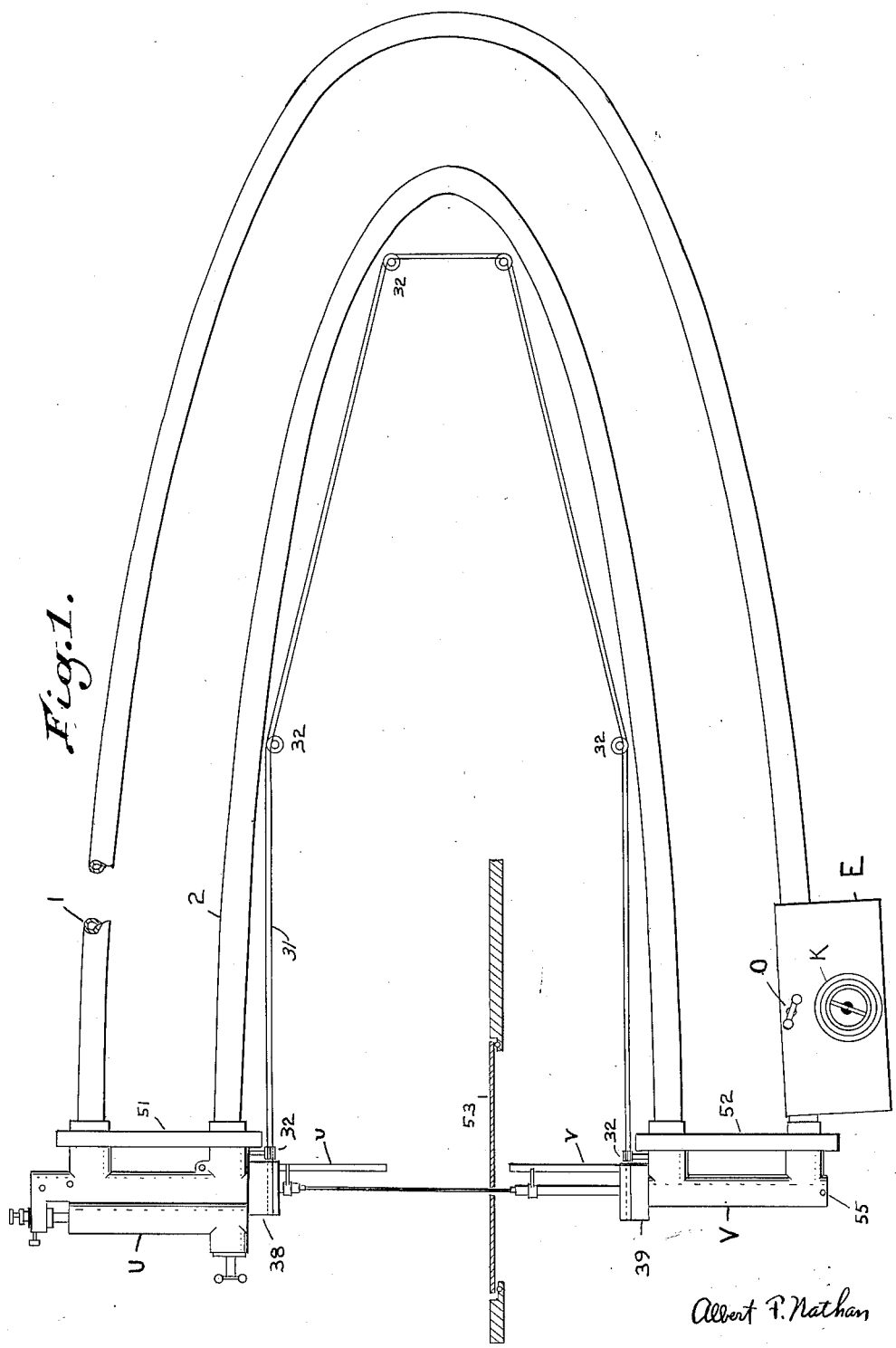
Fig. 1 is a side-elevation of the essential parts; the housing or frame being omitted for the sake of clarity.
Figure 2:
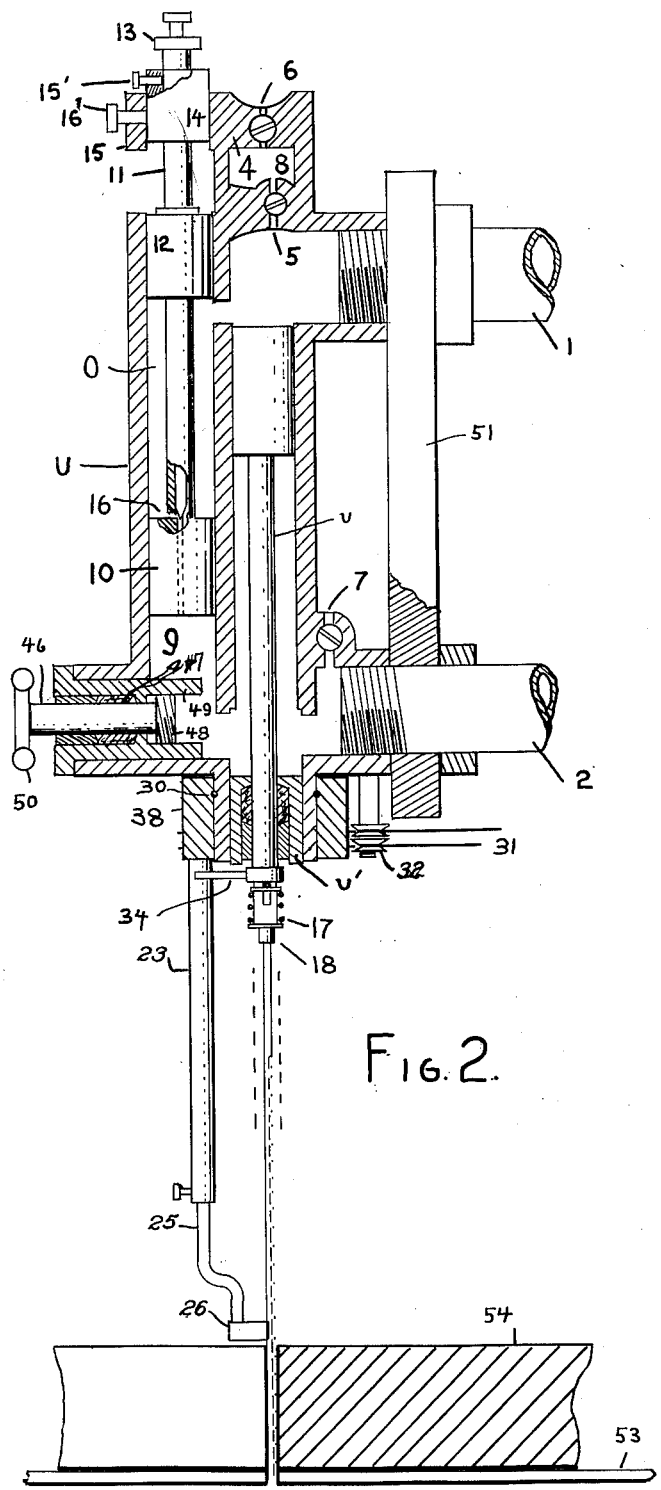
Fig. 2 is a vertical mid-section of the upper head and a portion of the table and a partly cut blank thereon.
Figure 10:
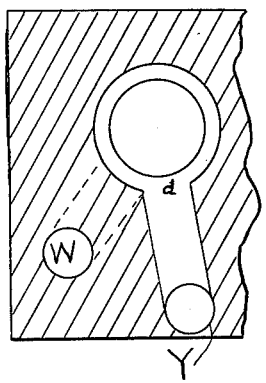
Fig. 10 is a fragmentary section through line 10—10 of Fig. 9.

A general understanding of this mechanism may be had in connection with the assembly view (Fig. 1) and the sectional detail Fig. 2 of the upper head. Two heads U and V, which are essentially cylinders and pistons are spaced apart in vertical alignment. These pistons have rods $u$ and $v$ which pass through stuffing boxes such as $u'$ (Fig. 2) and are directed towards each other. At their extremities they have suitable means for gripping the ends of a saw. The adjacent chambers of the cylinders which contain the rods are connected by a pipe 2. Likewise, the remote (rod-free) chambers of the cylinder are connected by another pipe 1. Both pipes run from the heads to the rear and form a semi-elliptical loop which constitutes the throat of the machine and the major axis of this loop may be made as long as desired without incurring any structural difficulties. Interposed in one of these pipes (preferably the latter) is a power-driven unit E for producing pulsations to and fro in the fluid within the system. The hydraulic system is a closed circuit in which the oil throughout is under sufficient pressure to take up all free swing or unrestricted elasticity throughout the system. The pistons are so formed and the ports so arranged and the conduits so disposed as to cause any incidental air in the system to accumulate in the upper-most points in the system (such as the air dome 4) which have outlet valves 5, 6 and 7. Valve 5 may be opened to collect air in the pocket 8 and provide a cushion when conditions of operation render it advisable or, by momentarily opening all valves in the dome and letting the air out, to enable the system to be operated without any cushioning; the oil itself being virtually incompressible. It will be seen, that the system is positive in that the piston-rods must reciprocate in absolute unison; always maintaining a constant distance between their external ends. For this reason, a most delicate blade can be held between the two rod-ends and, regardless of the frequency of reciprocation of the same, the blade is not being subjected to any inertia shocks other than of its own mass which is inconsequential; a No. Ten Zero blade weighing only .0312 gram. Inasmuch as the blade requires to be kept taut, one of the rods is provided with a small spring intervening between its extremity and a tip-piece which has a slight slide on the rod end. When affixing to the rods the ends of the blade, the rods are caused to approach sufficiently for that purpose and this is expeditiously accomplished hydraulically by opening a normally closed by-pass between the two main pipes. Thereupon, the rods may be moved independently manually or, by agency of a hand-shifted piston interposed between the two pipes.

The blade-tautener is shown in two modifications O and O'; the one built into the upper head (Fig. 2) and the other as a separate unit bridging the two pipes 1 and 2, as shown by Fig. 13. The former has the advantage of greater convenience in location, the latter simpler structurally and hydraulically. Both are for the same purpose. Each comprises a supplementary cylinder 9 ported at its ends to communicate directly as in Fig. 2, or indirectly as in Fig. 13 with the upper and lower ends of the head-cylinder. A piston 10 therein has its rod 11 passing through a stuffing box 12 and terminating externally in a finger-piece 13 which may be manipulated to move the piston to or fro to displace oil from the one to the other side of the saw-reciprocating pistons to cause an approach or separation therebetween, as the case may be. To lock the piston 10 against creep during the normal use of the machine, and also to enable it to be set in a location ensuring an accurate degree of tautness for the saw-blade, a micrometer adjustment is provided. This consists of a nut 14 threaded to a stationary boss 15. The rod slidably passes through the bore of the nut, but may be locked thereto by a set-screw 15', or the like. In the case of the form shown by Fig. 13, the piston-rod end of the supplementary cylinder communicates through pipe 2 with the piston-rod end of the working-cylinder. The areas of the respective piston and rods are ratioed so that the movement will avoid any material hydraulic lock. As in the case of Fig. 2, a small relief valve indicated by 16 may also be employed. After the device has been adjusted approximately, the set-screw 15' is tightened, and the nut and rod turned as a unit until the blade has the correct "ping." The other set-screw 16' is then tightened to retain this setting during the sawing operation. This micrometer adjustment is especially desirable for the finer blades which are too fragile to withstand much strain. For example, the end of a No. Ten Zero blade will just pass through a hole .013 in diameter; its shank dimensions being .0109 wide and .0062 thick. This is the hole size made by a No. 80 wire drill and corresponds to a No. 32 wire which if made of cable steel has a breaking strain of about 13 lbs. The hole made by an ordinary pin is three times this size. The blade is considerably less, however, because it is made of rectangular stock which is less than the circular area of a section of the wire, and since the teeth are cut in the stock, its section in that region is still further reduced. By reason of the independent synchronous movement of the piston-rods which carry the blade, it is not subjected to the momentum shocks of any of the machine elements, and its factor of safety is not thereby exceeded. Its predetermined tension is held constant by the relatively minute tension of the small spring 17 of the slide-tip 18 of the upper rod, so that all the reserve strength of the blade can be devoted to meeting the drag of cutting. This drag is less, in this machine, than when using a jeweler's hand-frame because, ceteris paribus, the one takes uniform light cuts rapidly and the other takes heavier and irregular cuts slowly.

In making use of fine jeweler's blades, the detail of gripping them has presented much mechanical difficulty. A blade of the size commonly known as Ten Zero is about six thousandths of an inch thick and eleven thousandths wide and it is accordingly exceedingly delicate and difficult to see. It must be mounted in accurate alignment in the gripping device else it will quickly break. When used for sawing out a closed or interior contour, a hole must be drilled through the work so that the blade may be put through it. Then it is clamped by the gripper. In delicate inlay work, a drill as small as a number 80 may be required so that the hole will be barely larger than the shank of the minute blade. A pin hole is large in comparison. Obviously, any permanent enlargement preformed on the ends of the blade would prevent it from being inserted in the hole. If the gripper be permanently mounted on the ends of the reciprocating shafts of the machine, it is difficult to see the same. Therefore, it is proposed that the ultimate blade gripper shall be a small detachable unit which can be readily manipulated first to affix it to the ends of the blade, and then to the reciprocating shaft. Several sizes of these units should be at hand to accommodate the range of blades to be used.

Fig. 4 shows the construction of a collet or gripper which will satisfy the aforesaid requirements. It consists of a shell 17' which is bored to receive a small steel ball 18' which would be, in diameter, about ten times the thickness of the shank of the blade. The lower end 19 of this bore is tapered at an angle of about 7°. A pre-slotted taper plug 21 is permanently inserted in the extremity of the taper bore so as to protrude sufficiently to enable the user to easily see and be guided by the slot into which the end of the blade is to be inserted. The ball is backed by a screw 22 and if desired by an intervening pad of rubber 23. The user first backs off the screw, leaving the ball free. When the blade is inserted in the slot, its end will lift the ball which will then flex it over to the side. The screw is then tightened to cause the ball to press the shank of the blade against the conical side wall and it will be held securely against withdrawal because any effort to withdraw it would cause the ball to grip with corresponding tightness. This gripper is then affixed to the end of the shaft by a crosswise taper pin 24 (or bayonet joint, if desired); the position of the pin being such as to be transverse to the width of the shank of the blade. By this means, the mounting of the blade in the machine is greatly facilitated and it will be found that the breakage of the blade will seldom occur at its ends where gripped. This gripper is furthermore readily cleaned at any time by removing the screw, pad and ball. It will be noted that the total mass of this collet is trivial and does not add materially to the inertia to be overcome by the operating unit or oscillator.

The blade orientor provides two similar annular collars 38 and 39; each respectively turnably mounted on the exterior hub of the stuffing-box at the piston-rod end of each cylinder. They are each held thereon suitably, as by a key and key-way 30. An endless wire 31 runs in a doubled loop from the one to the other via the end of the throat; being tracked by a number of small pulleys 32. See also diagrammatic view, Fig. 3. The upper end of the loop passes, as shown by the full and dotted lines, around the upper collar in a direction reverse to that shown by full and dotted lines on the lower collar. Each of these collars carries a guide rod 23; each as long as the maximum length of stroke. A little fork 34 attached to each piston rod near its extremity rides on this guide-rod to maintain the orientation of the piston-rod in constant relation to the guide-rod. When the user, with his finger, turns the more immediately accessible upper collar to re-orient the blade, the lower collar will therefore turn similarly on the lower head. The blade may thus be oriented into any sawing direction while the machine is in operation; thus rendering it unnecessary to swing the work around the blade as a center which cannot be done accurately if the board be large.

The hold-down may comprise a stiff wire 25 adjustably and detachably seated in the bore of the orienting rod 23, which in this case is a tube. At its lower extremity, this wire carries a small shoe 26 which at its forward end has a vertical slot proportioned in width and depth to receive the back of the blade and yet clear the teeth. It is advisable to have a series of these; each appropriate for its own size of blade. Universal devices for this purpose are not desirable because they obscure the vision and are difficult to adjust properly for very fine blades.

The oscillator for imparting the necessary pulsations to the system is designed to be motor driven at the highest possible speed consistent with an unobjectionable amount of vibration; the speed being variable to afford more when a shorter stroke is employed and less when the machine is set for a longer stroke. The design, accordingly, provides a balanced mechanism which is achieved by employing pairs of cylinders; the two cylinders of each pair operating in opposition. That is to say, the cam mechanism for operating the pistons simultaneously pushes apart and pulls together the alternate pairs of pistons, thus avoiding the objection of subjecting the driving mechanism to unbalanced alternate right and left shocks. Furthermore, the porting is so arranged that the amount of fluid in-drawn at each oscillation will be equal in volume to the amount expelled. This is important to prevent hydraulic locks and vibration.

These cylinders are arranged as shown by the drawings. The cylinders A and B of the one pair balance each other and those of the other pair C and D also balance each other. Likewise, each pair balances the other. The volumetric capacity of the remote portions of each cylinder are all equal, and the capacity of the adjacent portions are likewise equal but are somewhat lessened by the volume occupied by the piston rods. The porting is so arranged, however, that the total quantity discharged is always equal to and balanced by the total quantity in-drawn. Thus, when the two channels X and W (see perspective diagram, Fig. 8), are receiving the discharge, the other two channels Z and Y are delivering to the cylinders. The channels X and W both communicate with the outlet pipe, whereas, both channels Z and Y withdraw from the inlet pipe. They alternately exchange functions during each half revolution of the driving cams to be hereinafter explained. The total quantity received by the two delivery channels X and W during the forward stroke is four times the capacity of each end of one of the cylinders minus two times the capacity of the piston rods. This is the amount delivered by the ports $a$, $b$, $c'$ and $d'$, which balances the total amount of the intake ports $a'$, $b'$, $c$, $d$. Whereas, channels X and W on the one hand and Z and Y on the other hand may be each merged in one, it is found convenient to use them as shown to avoid cross-overs of the ports at structurally awkward points which would complicate the preparation of patterns and the making of castings therefrom.

Referring now to Figures 5 and 6 for structural details, the unit E comprises a block having a central well within which is located the cams G and G' upon a shaft F which passes through stuffing boxes L and K mounted on side plates $e$ and $e'$. A cover $e''$ seals the well which is normally filled with oil.

The shaft F is formed with two slide-ways $f$, $f'$ (on diametrically opposite sides of its axis) each identically sloping in its own plane away from the shaft axis. Mounted on these slide-ways are two cams G, G' each having an aperture at the same angle as the said slide-ways and keyed slidably thereto (as by the key-ways $g$, $f'$) so that when occupying the position shown by Fig. 5, they are concentric with the axis of the shaft F. These cams are shown as circular discs and are always located within a yoke H and are held in alignment therewith by side-plates $h$. Each of these yokes in turn is maintained upright in alignment with a pair of opposing cylinders by slide-ways $h''$ in block E and is connected to the pistons J thereof by corresponding piston rods I. Each of these piston rods passes through a stuffing box I' and is fastened to its piston J so as to reciprocate the same to the extent of the eccentricity of the cam with respect to the axis of the shaft F. It will be perceived that, if the shaft F be shifted axially from the position shown by Fig. 5, then each of the cams will acquire a progressively increased eccentricity with respect to the axis of the shaft and thereby each of the four pistons will be reciprocated precisely the same amount of stroke. While this shifting of the shaft may be accomplished mechanically, a remote control thereof is facilitated by doing it hydraulically and to, that end, it has a piston M within a small cylinder L. When oil is caused to enter through the pipe $m'$ and discharge on the other side of the piston through the other pipe $m$, the shaft can be brought to the point of zero eccentricity shown by Fig. 5, and conversely. To avoid undue side pull and wear on the shaft bearings, its operating pulley is preferably mounted on a bearing provided by the stuffing box $k$. The pulley has a cross-bar $k'$ which passes through a slot $k''$ which is long enough to always be in engagement in all lateral positions of the shaft.

When the piston shown in Fig. 5 moves towards the outer ends of the cylinder, it discharges oil through the port $a$, and draws in oil through the port $a'$; the operation of the opposite piston being converse. The ports of the four cylinders are connected to four conduits X, Y, Z and W, as previously explained in connection with the perspective diagram, Fig. 8.

Figure 9:
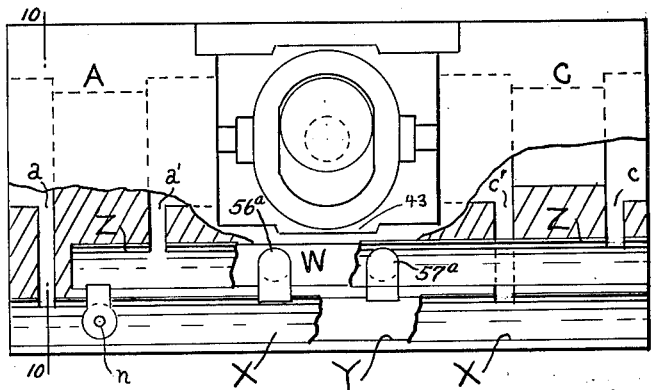
Fig. 9 is a sectional side elevation of the unit.

In connection with this it should be noted that the channels W and X are connected together. Likewise, the channels Y and Z are connected together. This is done as shown by Fig. 9 by providing cross channels 56ª and 57ª in the intermediate portion of the block; the one running from the conduit W laterally over the conduit Y and then down to the channel X; and the other running from the conduit Z laterally over the conduit X and then down to the channel Y. These L-shaped connectors thus insure the discharges from each of the four cylinders to enter one or the other but not both of the two channels X and Y. And, the intakes of all four of the cylinders are withdrawn at the same time from the other channel. The unit is interposed in one of the two main pipe lines of the entire system and is connected on one end of the unit to the channel X and on the other end of the channel Y so that the aggregate effect of the unit will be to subject the oil in that pipe line to alternate pulsations to and fro.

Figure 11:
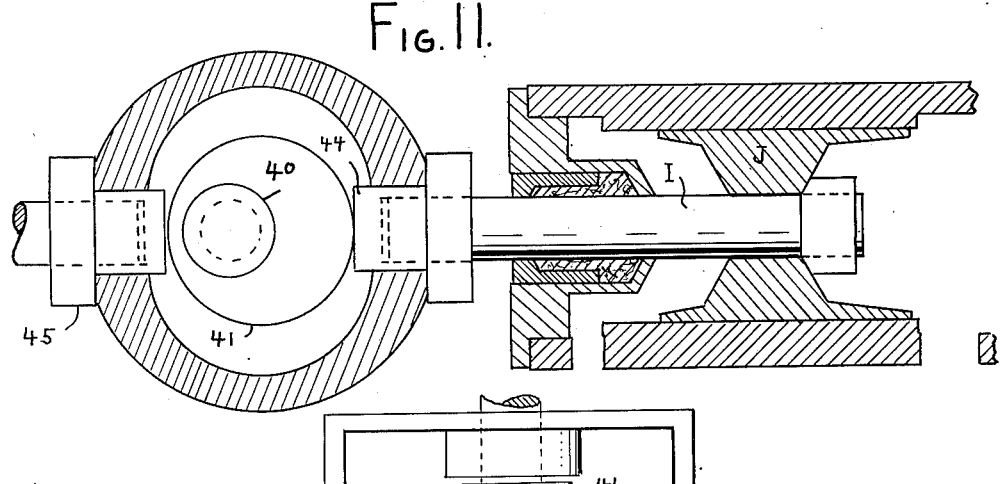
Fig. 11 is a mid-section of the cam, yoke and one piston of the modified unit shown by Fig. 12.
Figure 12:
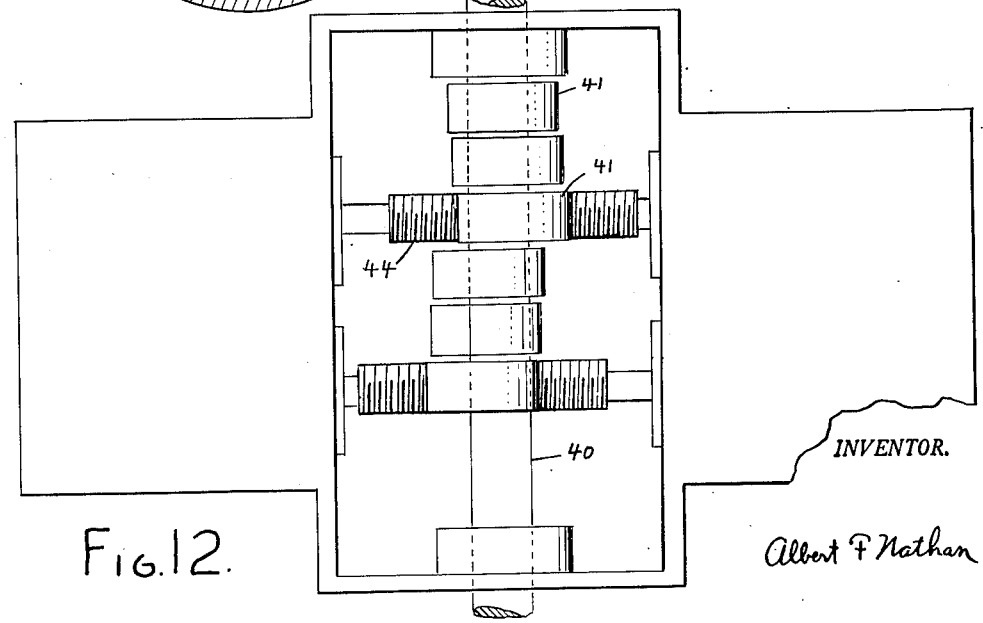
Fig. 12 is a plan of a modified unit yielding a selection of three different lengths of stroke.

A mechanically simpler construction of the cam mechanism of the oscillator is shown by Figs. 11 and 12. In this instance, the shaft is straight from one end to the other and on it are mounted one or more pairs of cams which are splined thereto and thus held from rotating independently thereon. These pairs are identical with the exception that the degree of eccentricity of each pair differs from that of the adjacent pair. By stopping the mechanism at the right point, the shaft with its cams may be shifted axially to bring the yokes 42 into engagement with any desired pair of cams and thus set the mechanism to yield a throw longer or shorter. It will be noticed that, in this construction the yokes are mounted as shown by Fig. 9 to be held upright by slide-ways 43 but they need no side plates because the shaft itself serves to hold the cams in their operating position; this being done by providing adjustable collars or a detent of ordinary type for engaging the shaft and causing it to remain in whatever axial position it has been shifted to. A desirable detail of construction is also shown in connection with the attachment of the yokes to the piston rods. To the ends of the piston rods are affixed buttons 44 which are hardened and ground before assembly of the mechanism. These buttons are threaded exteriorly to enter apertures provided by the hubs of the yokes and this enables them to be adjusted very delicately into contact on opposite peripheries of the hardened and ground cams and retained in that position by suitable lock nuts 45. By this means, back-lash at this point may be reduced to a minimum and wear taken up when and if it develops.

The cams are shown as circular disks and therefore are easily made and accurately ground without resorting to special grinding equipment. In this form, they impart a simple harmonic motion to the pistons. From the standpoint of theoretical mechanics, a purely gravimetric motion would be somewhat better in point of freedom from slight shocks and consequent reduction of vibration, but the making of gravimetric contours is troublesome and need be resorted to only in attaining exceptional smoothness in operation.

The zone-shifter will now be explained. The block of the oscillator, at intermediate points, is provided with special-purpose valves O and N (Figure 6) and these valves are provided with check balls $n$ and $o$. Thus, when the valve O is open, oil may flow at certain intervals, from the channel Y to the channel W. Likewise, when the valve N is open, at certain intervals, oil may flow from the channel X to the channel Z. But in neither case nor at any time can the flow take place conversely. The purpose of this is to cause a shift in the operating zone of the saw in either of the directions desired.

For adjusting the general pressure of the oil throughout the system, a simple plunger 46 (Figure 2) suffices and may be located anywhere. Thus, the upper head is cored to provide an opening into which is fitted a stuffing box 47 for the plunger 46 which at its inner end 48 is screw threaded to an extension 49 of the shell of the stuffing box. The threads are loose fitting to afford leakage and displacement of oil when, by turning the plunger by means of the handle 50, it is shifted axially somewhat into or out of the system.

The physical embodiment of this conception is exceedingly simple structurally. The two operative heads are held in position by two plates 51 and 52 carried by the main frame which may be of any desired form of construction which is not shown for the sake of clarity and disclosure of the essential features of the invention. The pipes 1 and 2, running from the upper end of the upper cylinder to the lower end of the lower cylinder and likewise from the lower end of the upper cylinder to the upper end of the lower cylinder, serve themselves as structural braces; being bent elliptically as shown by the general assembly view, Fig. 1, so as to form a substantial throat for the table 53 and the work 54 to be operated on and also contribute towards rigidity, while yet exhibiting relatively little weight. The main frame will be similarly contoured and provide appropriate supports for the pipes as well as for the plates on which the heads are mounted. This latter detail is desirable in facilitating the aligning of the heads with precision. The detail construction of the upper head is shown by Fig. 2 and is identical with the lower head except that it preferably embodies the means for adjusting the overall pressure in the system and also the means for adjusting the distance between the saw holding shafts.

This is done for the sake of having these adjustments very convenient to the user although, of course, these two adjustments can be arranged anywhere in the pipe system. The oscillator is located near the lower end of the lower cylinder to bring within easy reach of the user the valves N and O. Also, the remote control element similar to the unit ML of Fig. 5 may be located anywhere. It will be noted that the oscillator is inverted in position with respect to the detail views, Figs. 5 and 6. The reason for this is so that any air trapped in this unit will escape upwardly through the ports and, together with any air in the lower end of the lower cylinder, will rise through the pipes to the upper end of the upper cylinder where it can be released through the pet cocks shown therein. So also any air in the upper end of the lower cylinder will rise through the other pipe to the lower end of the upper cylinder where it also can be released through the pet cock shown. Thus, the whole arrangement is such as to cause any trapped air to accumulate at the last mentioned points where it can readily be expelled. The system is preferably filled with oil through the pet-cock 55 at the lower end of the lower cylinder; the aforesaid cocks being open during this period until the system is completely filled with oil and the machine is then in condition for operation.

The orientator may easily be adjusted into accurate correspondence between the upper and lower collars by the belt-tighteners 56 and 57 (Fig. 3) of conventional pattern.

This system lends itself to the handling of fine files such as are used by die-sinkers and which are best supported at both ends to overcome flexing, or it may equally well be employed for saber-saws or files stiff enough to operate unsupported at their upper ends. In the latter case the upper head may be dispensed with and the pipes 2 and 3 connected directly together. The facility of orienting the file by the means described enables the die-sinker more readily to follow abrupt curves and orient the file to operate in certain recesses without turning the blank and possibly obscuring the lines on the work.

In the several instrumentalities appertaining to this invention, pistons have been indicated. In the oscillator, where the strokes are short, as in the pressure-regulator which does not pulsate, metallic bellows may replace the pistons and a very considerable simplicity, structurally speaking be attained. However, in such bellows as are now commercially available, the metal undergoes fatigue and cracks after an indefinite number of rapid pulsations. When more desirable bellows become available, they can replace the pistons at a saving in cost of production; especially the oscillator.

Having thus revealed this invention, I claim as new and desire to secure the following combinations and elements or equivalents thereof, by Letters Patent of the United States:

1. A scroll saw combining a pair of axially aligned cylinders having closed vis-a-vis ends; a piston in each cylinder having its rod projecting through the opposing end of its cylinder; a sawblade attached at its ends to the ends of said rods; a first conduit connecting the remote ends of said cylinders; a second conduit connecting the near ends of said cylinders, said cylinders and conduits being filled with oil and forming a closed circuit; a power-driven hydraulic oscillator in series with one of said conduits; zone-shifting valves in parallel with said oscillator for temporarily by-passing some oil past said oscillator to enable the zone of reciprocation of said piston rods to be shifted.

2. A scroll saw according to claim 1 in which the zone-shifting valves comprise two oppositively effective one-way check valves and manual means for rendering either or both of said check-valves ineffective.

3. A scroll-saw combining two co-axial cylinders spaced apart and each closed at both ends; a piston in each cylinder having a rod projecting through the opposing end of its cylinder; the opposing outer ends of said two rods being spaced apart; means carried by the outer ends of the rods for attaching a saw thereto; a conduit connecting said opposing ends of said cylinders; a second conduit connecting the remote ends of said cylinders; said cylinders and conduits being entirely filled with an incompressible fluid and forming a closed circuit; means for pulsating said fluid to cause said pistons similarly to reciprocate in synchronism; a hair-like saw attached to the outer ends of said rods; a by-pass between said conduits, and a shiftable plunger closing said by-pass for transferring fluid from one to the other conduit to adjust the distance between the rod-ends to accommodate blades of different lengths and to regulate the tension thereof.

4. A system according to claim 3 in which the pulsating means comprises two pairs of coaxial pistons, a cam for reciprocating one pair as a unit, and a second cam for reciprocating said other pair of pistons; said cams being timed 180° apart to balance the inertia of the one pair against that of the other pair.

5. A jig-saw combining two relatively immovable coaxial cylinders spaced apart and each closed at both ends; a piston in each having a rod projecting through the opposing end of its cylinder; a first conduit connecting the opposing ends of said cylinders; a second conduit connecting the remote ends of said cylinders; said conduits and cylinders being entirely filled with an incompressible fluid and forming a closed circuit; means for pulsating said fluid to cause said pistons similarly to reciprocate in synchronism and independently of saw cooperation; a hair-like saw attached to the outer ends of said rods; and a normally closed by-pass between the conduits for transferring fluid from one to the other conduit to adjust the distance between the rod-ends to accommodate the length of the saw.

6. A jig-saw combining two relatively immovable coaxial cylinders spaced apart and each closed at both ends; a piston in each having a rod projecting through the opposing end of its cylinder; a hair-like saw attached to the outer ends of said rods; a first conduit connecting the opposing ends of said cylinders; a second conduit connecting the remote ends of said cylinders; said conduits and cylinders being entirely filled with an incompressible fluid and forming a closed circuit; an oscillator for pulsating said fluid to cause said pistons similarly to reciprocate in synchronism independently of saw-cooperation; a cam mechanism having a variable eccentricity for operating said oscillator and means for varying the eccentricity of said cam mechanism to change the amplitude of oscillation of the pistons.

ALBERT F. NATHAN.

REFERENCES CITED

The following references are of record in the file of this patent:

UNITED STATES PATENTS

| Number | Name | Date |
|---|---|---|
| 138,103 | Smith | Apr. 22, 1873 |
| 171,344 | Boettcher | Dec. 21, 1875 |
| 298,061 | Blessing | May 6, 1884 |
| 420,319 | Tardent | Jan. 28, 1890 |
| 606,051 | Cunningham | June 21, 1898 |
| 670,447 | Fulton | Mar. 26, 1901 |
| 720,944 | Meiklejohn | Feb. 17, 1903 |
| 1,124,981 | Weaver | Jan. 12, 1915 |
| 1,168,540 | Musselman | Jan. 18, 1916 |
| 1,215,431 | Tompkins | Feb. 13, 1917 |
| 1,220,369 | Slick | Mar. 27, 1917 |
| 1,633,463 | Sperry | June 21, 1927 |
| 1,716,121 | Giffen | June 4, 1929 |
| 2,114,241 | Tosten | Apr. 12, 1938 |
| 2,414,519 | Greene | Jan. 21, 1947 |
| 2,420,406 | Andrews et al. | May 13, 1947 |

FOREIGN PATENTS

| Number | Country | Date |
|---|---|---|
| 1,279 | Great Britain | May 6, 1857 |
| 13,208 | Great Britain | Nov. 2, 1885 |
| 67,226 | Germany | Feb. 25, 1893 |
| 8,969 | Great Britain | Apr. 24, 1908 |
| 415,466 | France | July 13, 1910 |
| 60,760 | Sweden | May 11, 1926 |
| 500,673 | Great Britain | Feb. 14, 1939 |